W. G. ELKIN.
INSECT EXTERMINATOR.
APPLICATION FILED JULY 21, 1915.
1,168,181.
Patented Jan. 11, 1916.
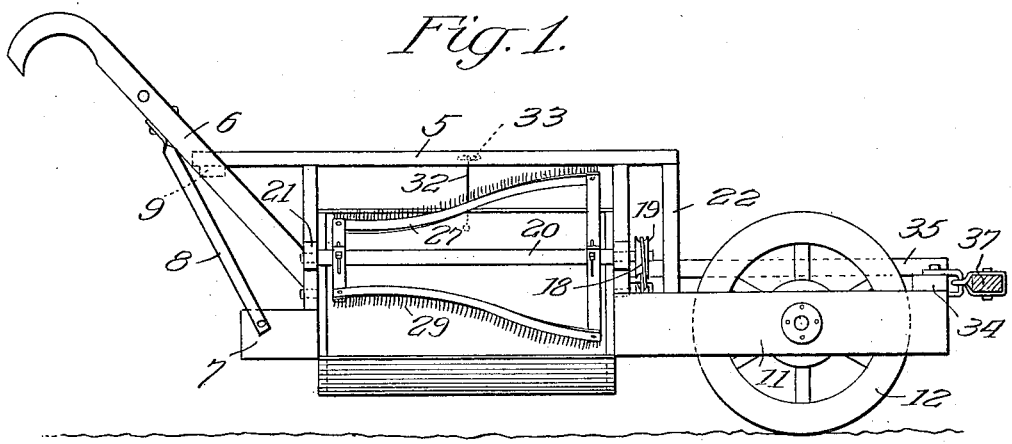
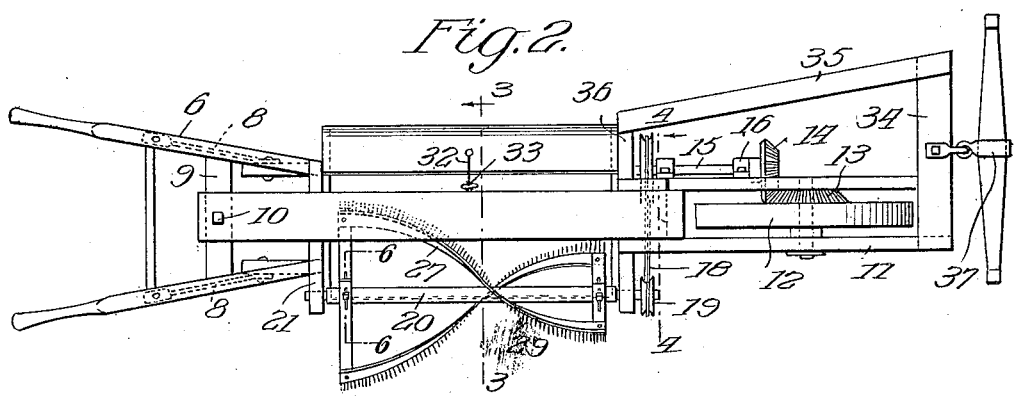
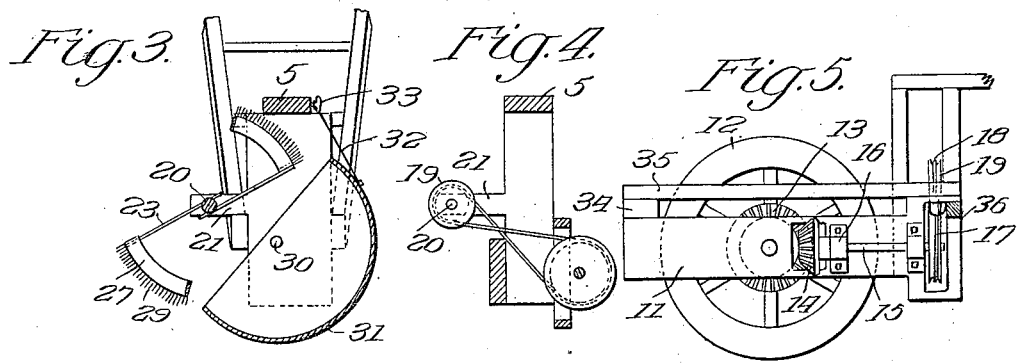
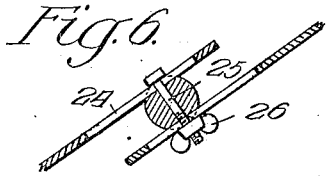
WITNESSES:
INVENTOR
WILLIAM G. ELKIN
BY
ATTORNEYS
THE COLUMBIA PLANOGRAPH CO., WASHINGTON, D. C.

UNITED STATES PATENT OFFICE.

WILLIAM GOLLOP ELKIN, OF FRENCH CAMP, MISSISSIPPI.

INSECT-EXTERMINATOR.

1,168,181.  Specification of Letters Patent.  Patented Jan. 11, 1916.

Application filed July 21, 1915. Serial No. 41,116.

*To all whom it may concern:*

Be it known that I, WILLIAM G. ELKIN, a citizen of the United States, and a resident of French Camp, in the county of Choctaw and State of Mississippi, have made certain new and useful Improvements in Insect-Exterminators, of which the following is a specification.

One of the principal objects of my invention is to provide an improved insect exterminator which may be readily driven by hand, its particular adaptation being for use in connection with cotton plants to trap and exterminate boll weevils, the device being in the nature of a hand-operated ground wheel supported framework, carrying an adjustable revolving brush adapted to rake the insects into an adjustable container wherein some suitable liquid may be contained for killing the insects.

A further object of the invention is to provide a device of the class described, employing suitable and durable mechanical structures, and one which may be easily operated and is inexpensive of manufacture.

With these and other objects in view which will become apparent as the description proceeds, the invention resides in the construction, combination and arrangement of parts hereinafter more fully described and claimed, and illustrated in the accompanying drawing in which like characters of reference indicate like parts throughout the several figures, of which—

Figure 1 represents a view in side elevation of a machine constructed in accordance with my invention. Fig. 2 represents a top plan view thereof. Fig. 3 represents a view in section taken vertically and transversely on the plane indicated by the line 3—3 of Fig. 2. Fig. 4 represents a fragmentary view in section taken vertically and transversely on the plane indicated by the line 4—4 of Fig. 2. Fig. 5 represents a fragmentary view in elevation of the forward portion of the machine looking at the same on the opposite side of that viewed in Fig. 1. Fig. 6 represents a fragmentary view in section taken transversely on the plane indicated by the line 6—6 of Fig. 2.

In carrying out my invention I provide a framework including a yoke 5, to whose rear end handles 6 are connected, blocks 4 being secured to the lower portion of the yoke at its rear end. Connecting these blocks with handle 6 are braces 8. A cross-bar 9 extending between the handles serve as means to which the rear end of the upper bar of the yoke is anchored, as at 10.

To the forward end of yoke 5 and at the lower portion thereof are secured the forwardly extending spaced parallel beams 11, between which a ground wheel 12 is journaled. This wheel is provided with a bevel gear 13 with which a bevel pinion 14 mounted on a shaft 15 carried in brackets 16 on the outside of one of the beams 11, meshes. At the opposite or rear end of shaft 15 is mounted a driving pulley 17, over which a crossed-belt 18 runs. The latter also plays upon a pulley 19 mounted at the forward end of a shaft 20. The latter is journaled in arms 21 extending laterally from the forward and rear uprights of the yoke.

A vertical bar 22, which at its lower end is engaged between beam 11, connects at its upper end with the forward ends of the top member of the yoke, and while strengthening the yoke and beams, serves as a protection for the driving mechanism for shaft 20. Extending in opposite directions from shaft 20 adjacent the forward and rear ends thereof, are pairs of arms 23. Each of the latter at its inner end rests upon a flattened portion of the shaft and is provided with a slot 24 through which a bolt 25 carried by the shaft, as indicated in Fig. 6, extends. This bolt is provided with a thumb nut 26 whereby the arms 24 may be tightened against the shaft in order to maintain them in adjusted position.

The arms at their outer ends carry the spirally-shaped bars 27, from which bristles 29, forming brushes, extend. By adjusting the arms 23 laterally with respect to shaft 20, the brushes may be moved into the proper positions for sweeping the insects from the plants, the adjustments being regulated by the height and the amount of growth of the plants. Mounted upon a shaft extending longitudinally of yoke 5 in the lower portion thereof, is a substantially semi-cylindrical pan or receptacle 31. This pan may be swung upon the shaft 30 as a pivot into the proper position relatively to the brushes 29, to receive the insects as the brushes sweep the insects from the vegetation. Suitable means may be provided for adjusting the pan, such as a flexible element 32, connected with the pan on one side thereof and adapted to be engaged over a pin or cleat 33 carried by the top bar of yoke 5.

Some suitable liquid such as coal-oil may be placed in pan 31, if desired, so as to kill the insects as the latter are deposited in the pan.

Carried by bars 11 at the forward ends of the latter is a cross bar 34. The latter extends laterally and projects beyond the side of the yoke adjacent which the shaft 15 is disposed. A bar 35 connects this bar 34 with an arm 36 which extends from the forward portion of the yoke in an opposite direction to which one of the arms 21 in which shaft 20 is journaled extends. The bars 34 and 35, together with the arm 36 serve to brace the structure at the forward end of the machine, and serve to protect the driving mechanism from bushes, and prevent plants and weeds becoming entangled therewith. A draft element in the nature of a single tree indicated at 37 may if desired be connected with bar 34 centrally thereof so that the brace may be drawn by a draft animal.

It will be understood that the device is adapted and intended to be ordinarily driven by hand, the draft device being provided merely in cases where the going is particularly heavy.

In operation the device is moved along a row of cotton or other plants with the rotary brush disposed adjacent the row, so that as the machine travels along this brush will flay the plants and will rake the insects from the plants into the receptacle or pan 31, where they may be killed by the liquid contained, or be retained until such time as they may be otherwise destroyed. The brushes may be adjusted so as to properly engage the plants, the degree of adjustment being determined by the height to which the plants have grown and the receptacle 31 may likewise be adjusted to proper position relatively to the brushes for receiving the insects as they are raked from the plants.

Although I have described the preferred embodiment of my invention I may desire to make such changes in the construction, combination and arrangement of parts thereof as do not depart from the spirit of the invention and the scope of the appended claims.

I claim:—

1. In a device of the class described comprising a yoke having handles connected to the rear end thereof, a pair of spaced beams connected with the forward end of the yoke, a ground wheel mounted for rotation between said beams, a shaft journaled to one side of the yoke, a driving mechanism arranged between the ground wheel and shaft whereby the latter may be driven as the machine moves along, a rotary brush carried by said shaft, a receptacle mounted within the yoke and adapted to receive insects raked from vegetation by action of said brush, a laterally extending beam carried at the forward end of said spaced bars, an arm extending laterally from the yoke and a beam connecting last said beam and arm whereby to strengthen the device and to provide protection for the driving mechanism, substantially as described.

2. A device of the class described comprising a vertically disposed yoke having handles secured at its rear end and having a pair of spaced beams connected at its forward end, a ground wheel journaled between the beams, a shaft carried by one of said beams, a bevel pinion mounted upon said shaft, a bevel gear mounted upon the ground wheel and meshing with said pinion, a shaft journaled on the opposite side of the yoke from that on which first said shaft is disposed, a rotary brush carried by the second said shaft, driving means between the shafts whereby the brush may be driven as the ground wheel rotates, and a receptacle carried by the yoke and adapted to receive insects raked from plants by action of said brush.

3. A device of the class described comprising a yoke having handles and a ground wheel associated therewith, a shaft journaled longitudinally of the yoke to one side thereof, driving mechanism between the ground wheel and shaft for operating the latter as the ground wheel rotates, a plurality of arms connected with the shaft, brushes carried by the arms, means whereby said arms may be adjusted laterally with respect to the shaft for adjusting the diameter of the path of revolution of the brushes, and a receptacle journaled in said yoke and adapted to be adjusted relatively to the brushes.

WILLIAM GOLLOP ELKIN.

Witnesses:
D. R. MECKLIN,
R. A. DOWNING.

Copies of this patent may be obtained for five cents each, by addressing the "Commissioner of Patents, Washington, D. C."